Figure 1:
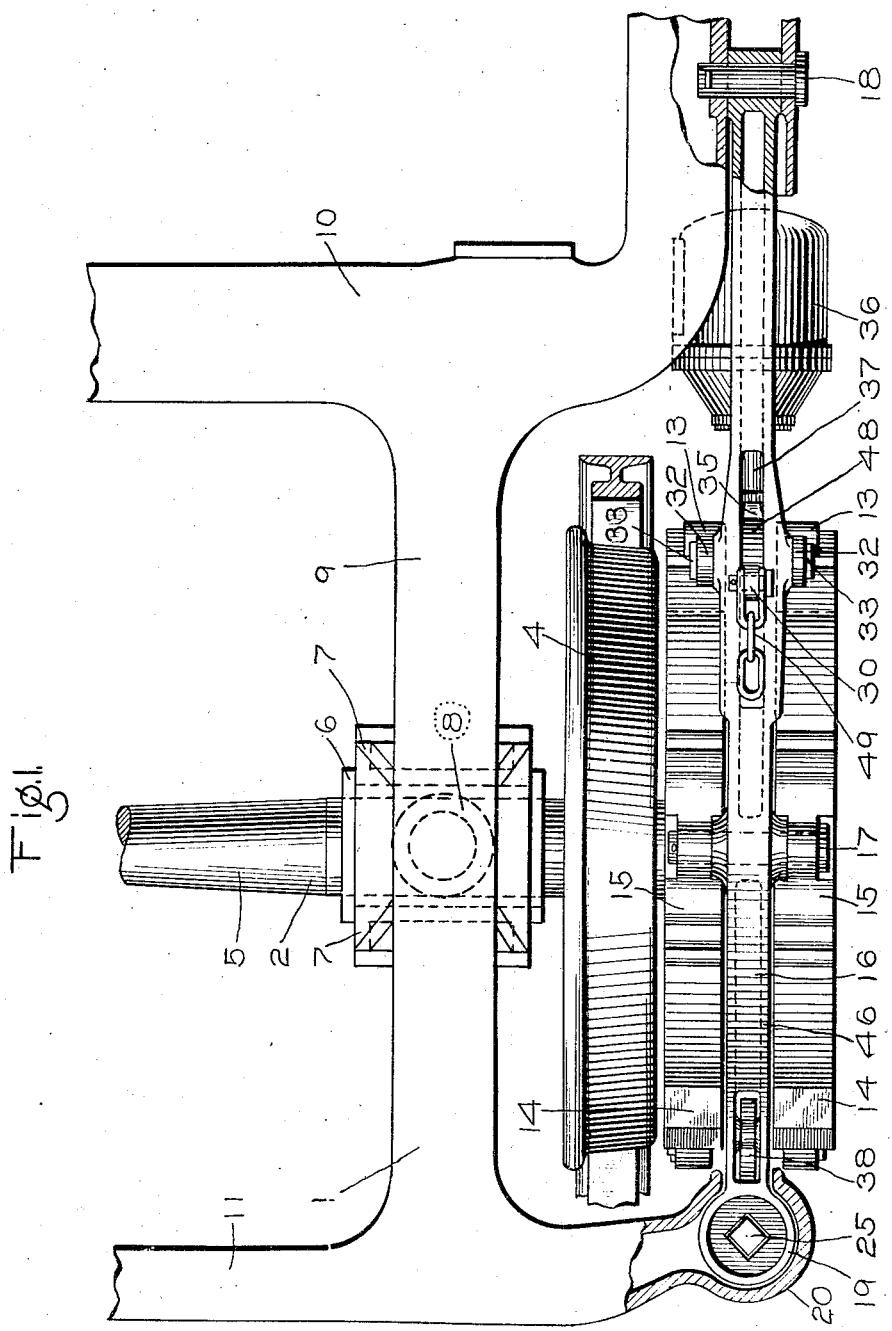

Oct. 31, 1939.  C. D. STEWART  2,177,953
BRAKE MECHANISM
Filed June 18, 1938  4 Sheets-Sheet 1

INVENTOR
CARLTON D. STEWART
BY
ATTORNEY

Oct. 31, 1939.  C. D. STEWART  2,177,953
BRAKE MECHANISM
Filed June 18, 1938  4 Sheets-Sheet 2
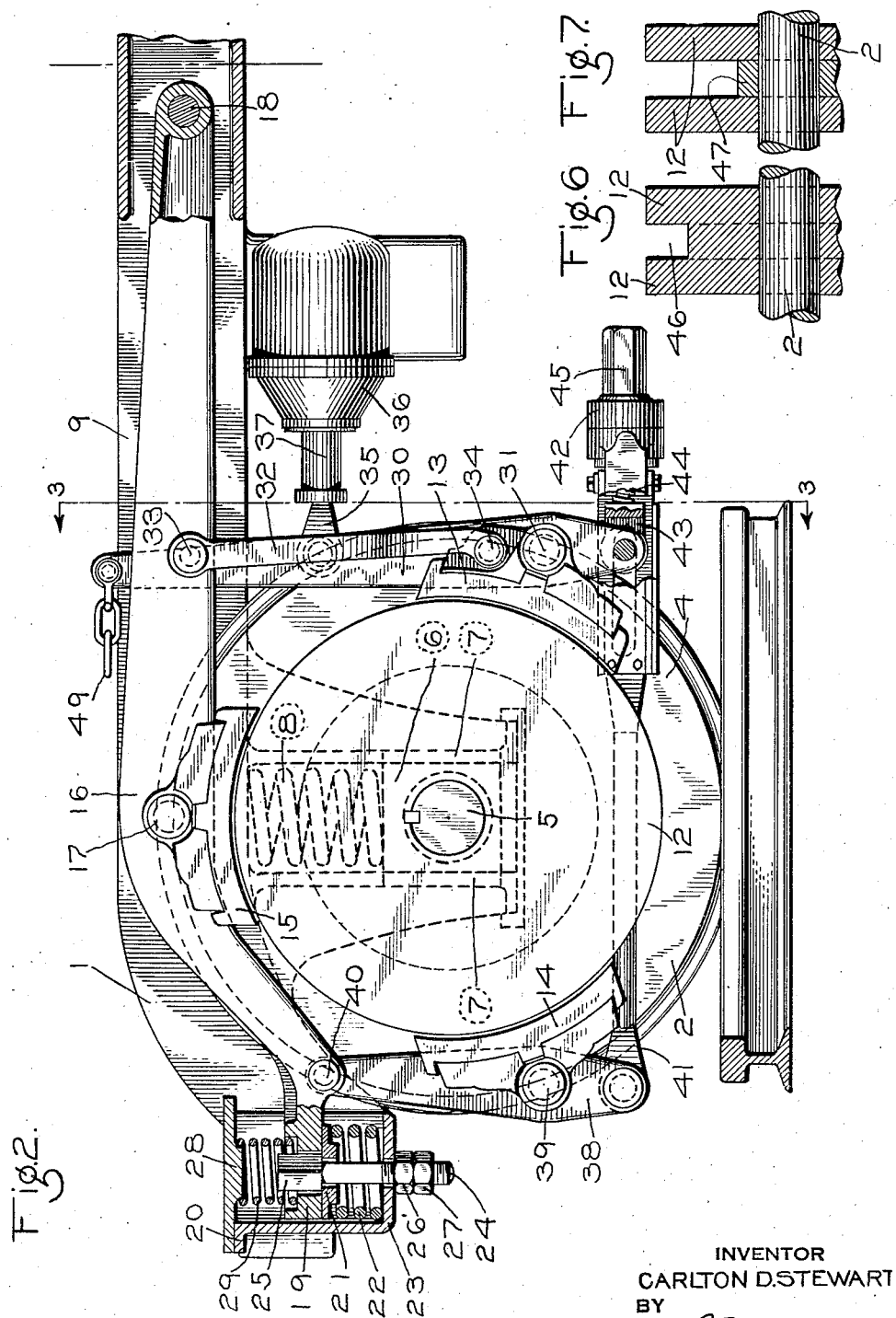
INVENTOR
CARLTON D. STEWART
BY
A. M. Higgins
ATTORNEY Oct. 31, 1939.  C. D. STEWART  2,177,953
BRAKE MECHANISM
Filed June 18, 1938     4 Sheets-Sheet 3
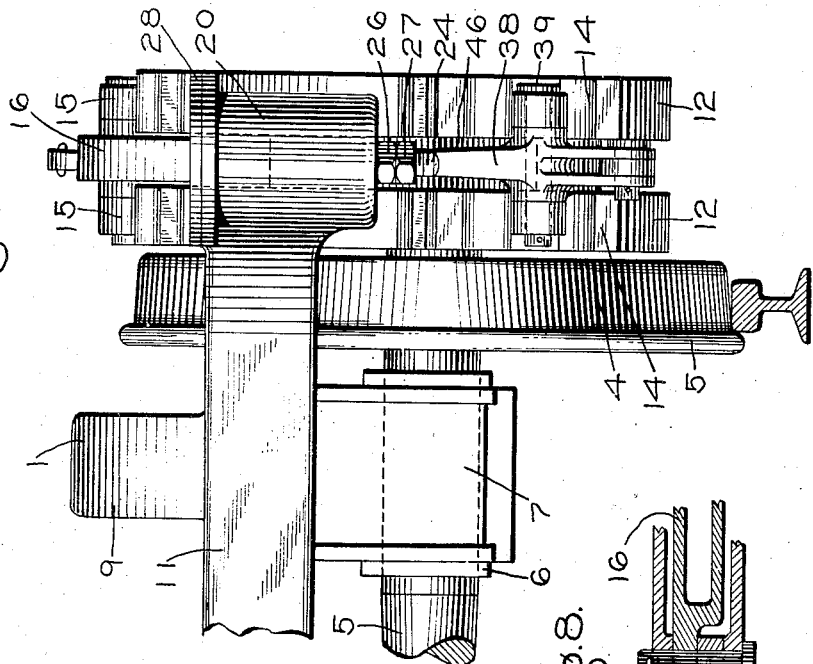
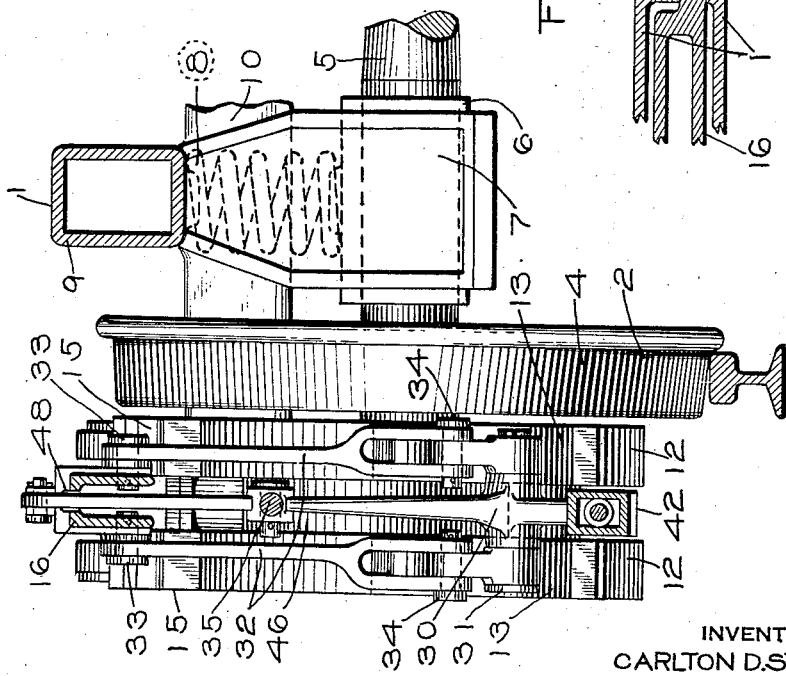
INVENTOR
CARLTON D. STEWART
BY
ATTORNEY Oct. 31, 1939.  C. D. STEWART  2,177,953
BRAKE MECHANISM
Filed June 18, 1938 4 Sheets-Sheet 4
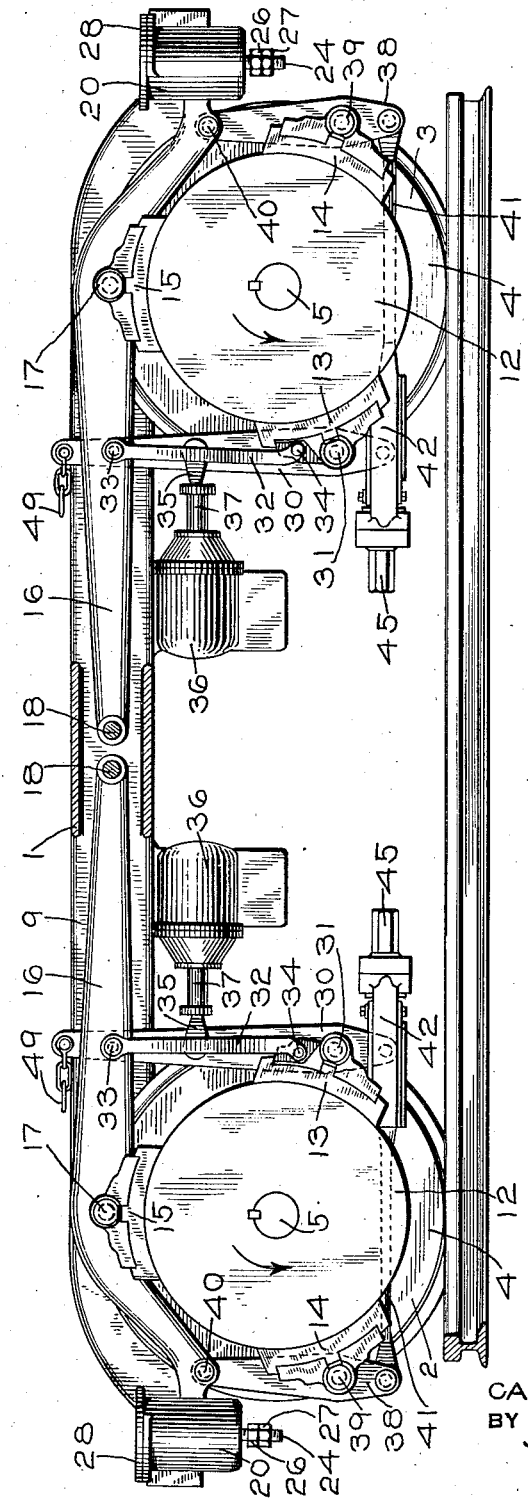
INVENTOR
CARLTON D. STEWART
BY
ATTORNEY Patented Oct. 31, 1939

2,177,953

UNITED STATES PATENT OFFICE 2,177,953

BRAKE MECHANISM

Carlton D. Stewart, Wilkinsburg, Pa., assignor to The Westinghouse Air Brake Company, Wilmerding, Pa., a corporation of Pennsylvania Application June 18, 1938, Serial No. 214,517

38 Claims. (Cl. 188—58)

This invention relates to brake mechanisms for railway vehicle trucks and more particularly to a brake mechanism of the clasp type.

In the present designs of railway vehicle trucks in which the truck frame is resiliently supported from a plurality of wheel and axle assemblies and in which the truck frame supports the clasp brake rigging, it has been generally considered that with the brakes applied the forces transmitted through the brake hangers to the truck frame tend to balance themselves and therefore exert no material downward pull on the truck frame. It can be shown, however, that this is not actually the case with the modern types of clasp brake mechanisms. In such mechanisms the brake shoes are, for practical reasons, hung below the horizontal center line of the wheel and with the shoes thus positioned, force applied thereto through the medium of the usual operatively connected levers and rods is resolved into several components one of which tends to move the shoes downwardly along the tread of the wheel, thereby tending to move the truck frame downwardly in opposition to the force of the springs supporting the truck frame.

When the wheels are rotating and an application of the brakes is initiated, friction also tends to move one shoe on each wheel downwardly and the other shoe upwardly. If the frictional forces are in excess of the vertical component of the brake rigging forces which tend to move the shoes downwardly along the tread of the wheel, then one shoe tends to be carried downwardly and the other shoe upwardly by the predominant frictional forces and in such a case the forces transmitted through the truck frame would be substantially balanced. It has however been ascertained that the rotational frictional force of braking tending to move one shoe upwardly does not at any time exceed the force tending to move the shoe downwardly along the tread of the wheel, so that the net tendency of both shoes on the wheel is to move the truck frame downwardly relative to the wheel and axle assembly. This is especially true when the vehicle is being operated at high speeds and where very heavy shoe pressures are required, and where as a consequence of the high speed at which the wheel is rotating the frictional resistance between the wheel and shoe is relatively low. Upon such movement of the truck frame the distance between the brake shoe and the horizontal center line of the wheel increases which acts to further increase the downward force component acting on the truck frame.

As a result, the truck frame is pulled downwardly until it meets a solid stop or at least until the frame supporting springs are almost completely compressed. Under this condition, the wheels cannot freely adjust themselves to vertical inequalities in the track rails and as one or more of the wheels pass over the uneven sections of the rails, they may for an instant have a tendency to leave the rails or at least have a greatly reduced frictional contact therewith. When this occurs the tendency of the wheels to slide is greatly increased, and since wheel sliding is, for well known reasons, very objectionable, it is extremely desirable that the conditions referred to be eliminated.

An attempt to relieve this condition by locating one brake shoe above and the other equidistantly below the horizontal center line of the wheel is not sufficiently effective because such an equidistant location cannot be maintained as the brake shoes wear away, nor is such an arrangement practicable in many truck designs; also, the arrangement would be suitable only for trucks moving in one direction only.

The principal object of the present invention is to provide a combined truck frame and brake arrangement whereby the aforementioned difficulties are eliminated, and a further feature resides in the utilization of the downwardly directed forces set up in the brake rigging when an application of the brakes is being effected to increase the amount of friction braking surface engaging the wheel and axle assemblies and thereby increase the braking effect on the assemblies for any chosen brake applying force.

According to these features, the brake rigging for each end of each wheel and axle assembly is carried by a combined lever and brake supporting member which is pivotally connected at its inner end to the truck frame at a point located on or adjacent the transverse center line of the truck and which, at the other or outer end, is supported from the adjacent portion of the truck frame by means of a spring. The total value of all of such springs is considerably less than that of the usual truck frame supporting springs but each is of sufficient value to maintain the supporting member and thereby the brake rigging in normal release position.

This combined lever and supporting member is provided, intermediate its ends, with a brake element or shoe which, when an application of the brakes is being effected, is pulled down into braking engagement with the wheel and axle assembly by the action of the other brake shoes on the wheel and axle assembly. The operative connections between the combined lever and supporting member and the brake shoes carried thereby, and between the member and the brake rigging and between the member and the truck frame, are so located that when the brake shoes carried by the member are in braking engagement with the wheel and axle assembly such shoe and member constitute a rigid support for the brake rigging and carries the greater portion of the load imposed thereon by the action of the other brake shoes and the rigging.

It should here be mentioned that on the rear or trailing wheel and axle assembly of the truck the member will transmit a downwardly directed force to the truck frame at the point of connection between the member and the frame, and that on the front wheel and axle assembly the corresponding member will transmit an opposing upwardly directed force on the frame. In the present embodiment of the invention the several parts of the mechanism are so proportioned that this upwardly directed force will be just slightly greater than the downwardly directed force, and from this it will be apparent that when an application of the brakes is being effected the brake rigging will not act to impose a downwardly directed load upon the truck frame.

In braking trains, especially those being operated at high speeds, it is the usual practice to reduce brake cylinder pressure to partially release the brakes when the wheels have a tendency to slip on the track rails. It is very desirable that this partial release be accomplished very quickly and with a minimum reduction in brake cylinder pressure so as to maintain the maximum braking effect without danger of wheel slip. However, this control of the release of the brakes is not possible with the usual type of truck and brake rigging in which the truck frame is spring supported from wheel and axle assemblies and the brake rigging is carried by the truck frame in such a manner that the brake shoes are located below the horizontal center lines of the assemblies, and in which the truck frame is pulled downwardly relative to the wheel and axle assemblies and compresses its supporting springs, the action of which springs in initiating a release of the brakes being detrimental to the proper control of the release of the brakes as will be apparent from the following description.

In effecting a partial release of the brakes following a heavy application of the brakes, the compressed truck frame supporting springs, acting through the medium of the truck frame and the brake rigging, cause the brake shoes to move upwardly toward the horizontal center lines of the wheel and axle assemblies, and thus act to maintain the brake shoes in heavy braking engagement with the assembly. From this it will be seen that the action of the truck supporting springs offsets to a large extent the reduction in brake cylinder pressure until such time as the truck frame and thereby the brake shoes are raised to substantially their normal positions, at which time the action of the springs ceases and the partial release of the brakes is finally effected through the further reduction in brake cylinder pressure. Under actual service conditions it was found that it was necessary to reduce brake cylinder pressure as much as 40% before the reduction in the braking force of the brake shoes was decreased to such an extent as to insure against wheel slip. From this it will be seen that the truck frame supporting springs act to delay the quick partial release of the brakes and at the same time render it necessary to reduce brake cylinder pressure much lower than desired, thus reducing the efficiency and flexibility of control of the release of the brakes.

According to the present invention the truck frame supporting springs are not compressed by the braking action of the rigging and therefore cannot in any way interfere with the control of the partial release of the brakes, so that the invention eliminates the above objectionable control features.

Other objects and advantages will appear in the following more detailed description of the invention.

In the accompanying drawings:

Fig. 1 is a plan view of a portion of a railway truck and brake rigging embodying the invention; Fig. 2 is a side elevational view, partly in section of the same; Fig. 3 is a vertical sectional view taken on the line 3—3 of Fig. 2; Fig. 4 is a fragmentary end elevational view of the truck and brake rigging; Fig. 5 is a side elevational view of the truck frame and brake rigging drawn on a reduced scale and showing the brake rigging in brake applying position; Fig. 6 is a fragmentary sectional view taken through the brake drums; Fig. 7 is a like view of a modified drum construction; and Fig. 8 is a fragmentary sectional plan view of a modification of a portion of the invention.

For illustrative purposes the invention is shown embodied in a railway vehicle truck of the type having a cast metal truck frame 1 and two longitudinally spaced wheel and axle assemblies 2 and 3, each of which assemblies comprises laterally spaced wheels 4 which may be secured in any desired manner to the axle 5 so as to rotate therewith.

Between the wheels and at each side of the truck each axle is suitably journaled in a journal bearing 6, loosely mounted between spaced pedestal jaws 7 depending downwardly from the truck frame, and seated on the journal bearings and resiliently supporting the truck frame are springs 8.

The truck frame differs somewhat from the conventional type of frame in that the side frames 9 thereof are inset or recessed opposite each wheel to accommodate the wheel, and in that the pedestal jaws and journal bearings are disposed inboard of the wheels. The side frames 9 may be integrally connected together in the usual manner by transversely extending transoms 10 and transversely extending end pieces 11.

Located outboard of each wheel of each wheel and axle assembly but adjacent thereto are two spaced annular brake drums 12 which are preferably integral with each other and which are secured to the outer end of the axle so as to rotate therewith. Each of these brake drums is provided with an outer or peripheral braking surface which is adapted to be frictionally engaged by brake elements 13, 14 and 15 radially arranged about the drum, the elements 13 and 14 being located below the horizontal center line of the drum and at opposite sides thereof, and the element 15 being located above the drum on substantially the vertical center line thereof. It will here be understood that each brake element may comprise the usual brake shoe and brake shoe head and since this combination of head and shoe is well known the elements will, for simplification, be hereinafter referred to by the term brake shoe.

The brake shoes 15 are pivotally carried by a combined lever and brake rigging supporting member 16 which extends longitudinally of the truck on the outer side of the adjacent side frame 9 and above the brake drum, the brake shoes being arranged one on each side of the member and being operatively connected to the member by means of a transversely extending pin 17.

The inner end of the member 16 is pivotally connected to the adjacent truck side frame 9 by means of a transversely extending pin 18. The outer end of the member is made in the form of a circular seat 19 which is loosely mounted for vertical movement in a pocket 20 formed in one end of the truck frame. This seat 19 rests on a spring seat 21 carried by a spring 22 which is seated on the bottom wall 23 of the pocket 20. Extending through a central circular opening in the spring seat 21 and an aligned opening in the wall 23 is a bolt 24. This bolt is provided at its upper end with a head 25 which forms a stop for the spring seat to limit upward movement of the seat relative to the wall 23. Exteriorly of the pocket 20 there is screwed on the lower screw-threaded end of the bolt an adjusting nut 26 which, as will hereinafter more fully appear, is adapted to be engaged by the wall 23 to limit upward movement of the bolt. Also screwed on this portion of the bolt is a check nut 27 which is adapted to lock the nut 26 in its proper adjusted position.

It will here be understood that the springs 22 are of considerably less value than the truck supporting springs 8 so that they may be compressed without compressing the springs 8. These springs 22 are, however, of such value that when the brakes are released they will support the members 16 and thereby the brake riggings in the positions in which these parts are shown in Figs. 1 to 4, inclusive.

The head 25 of the bolt is square in cross-section and extends through a correspondingly shaped opening in the seat 19, there being a slight operating clearance between the head and the seat.

Interposed between and operatively engaging the seat portion 19 of the member 16 and a cover plate 28 secured to the casing forming the pocket 20 is a spring 29 which is adapted to oppose undue upward movement of the member 16 relative to the truck frame when the brake rigging is in release position and the truck is subjected to service shocks.

The brake shoes 13 at each end of each wheel and axle assembly are arranged one on each side of a vertically disposed brake cylinder lever 30 and are pivotally connected to such lever intermediate its ends by means of a transversely extending pin 31.

For supporting each lever 30 and the brake shoes operatively connected thereto, hangers 32 are provided which are arranged one on each side of the lever. Each hanger at its upper end is pivotally mounted on a horizontally disposed trunnion carried by and extending outwardly from one side of the member 16, which trunnion in the present embodiment of the invention, is in the form of a pin 33. The lower end of each hanger is operatively connected to one of the brake shoes 13 by means of a pin 34, which pin in the present embodiment of the invention is located at a point slightly above the pin 31. It will here be noted that the hangers support the brake cylinder lever through the medium of the brake shoes 13.

Above the pins 31 and 34 each lever 30 is operatively connected to the outer end of the push rod 35 of a brake cylinder device 36 which may be of the conventional type having a cylinder casing in which there is operatively mounted a piston having a hollow piston rod 37 in which the push rod is operatively mounted, which piston is responsive to the pressure of fluid supplied to the cylinder portion to actuate the lever to effect an application of the brakes, and which operates upon the venting of fluid from the cylinder portion to permit the lever to assume its normal release position under the influence of the force of gravity as is usual. Since such brake cylinder devices are so well known a detailed showing of all of the parts thereof is deemed unnecessary.

The brake shoes 14 at each end of each wheel and axle assembly are arranged one on each side of a vertically disposed hanger lever 38 and are pivotally connected to the lever by means of a transversely extending pin 39. The upper end of this lever is pivotally connected to the outer end portion of the member 16 by means of a pin 40.

The lower ends of the brake cylinder lever and the hanger lever are operatively connected together by means of a longitudinally extending connector which, in the present embodiment of the invention, may comprise a rod 41 which is operatively connected at one end to the hanger lever 38 and at its other end is operatively connected to the brake cylinder lever 30 through the medium of a slack adjuster 42 carried by the rod 41.

The slack adjuster 42 may be of any conventional type having a movable cross head 43 which is operatively connected to the lower end of the brake cylinder lever and which may be actuated by a screw mechanism 44 adapted to be manually operated through the medium of an adjusting nut 45.

As shown in Fig. 6, and as hereinbefore mentioned the brake drums 12 are made integral with each other and the braking surfaces thereof are separated in a direction longitudinally of the axle by a circular groove 46 which is of sufficient width and depth to accommodate the connector 41 which extends into the plane of the drum. If desired the drums 12 may be made separate from each other as shown in Fig. 1 and these separate drums may be spaced apart to accommodate the connector rod 41 by means of an annular sleeve 47 which is carried by the axle.

The upper end portion of each brake cylinder lever 30 extends through a vertically extending opening 48 formed in the adjacent member 16, and above the member has a hand brake pull rod or chain 49 operatively connected thereto, which pull rod or chain is adapted to be actuated through the medium of the usual manually operable brake mast. It may be that adequate manual braking of the vehicle may be accomplished through the medium of one wheel and axle assembly of the truck and when this is the case, the hand brake connections to the brake cylinder levers of the brake rigging for the wheel and axle assembly which is located farthest away from the end of the vehicle may be omitted and the levers 30 made shorter.

With the brake cylinder devices 36 devoid of fluid under pressure each brake rigging will be in release position as shown in Figs. 1 to 4, inclusive and will be maintained in this position by the force of gravity or by a release spring when such a spring is employed. In this position the weight of the brake rigging which is transmitted to the outer end of the member 16 will be insufficient to compress the spring 22 even though the truck be subjected to the usual service shocks. From this it will be apparent that when the brake rigging is in release position the spring 22 will maintain the member in its normal position in which the associated brake shoes 15 are out of contact with the adjacent brake drums.

Application of the brakes

When it is desired to effect an application of the brakes, fluid under pressure is admitted in the usual manner to each brake cylinder device 36. In response to the pressure of fluid thus admitted, each brake cylinder device functions to actuate the brake cylinder lever 30 associated therewith and thereby the adjacent hanger lever to cause the brake shoes 13 and 14 to frictionally engage the peripheral braking surfaces of the brake drums. With the brake shoes 13 and 14 in such engagement the increasing force being applied to the brake shoes through the operation of brake cylinder device causes the shoes to move downwardly along the peripheral surface of the drum. This downward movement is due to the location of the shoes below the horizontal center line of the brake drum and to the application of the braking force to the shoes in a direction substantially parallel to the horizontal center line of the drum. The downwardly directed force, due to such action, being transmitted through the brake cylinder lever 30, the hangers 32 and the hanger lever 38 to the member 16 causing the member to move downwardly about the pin 18 and against the opposing action of the spring 22 until such time as the brake shoes 15 engage the drums. At this time downward movement of the member 16 and the brake rigging will stop since the member will now be rigidly supported by both the truck frame and the brake drums.

With the wheels 4 and brake drums 12 rotating in the direction indicated by the arrows in Fig. 5, the drag of the drums on the brake shoes 14 at the front end of the truck will cause a further downwardly directed pull to be applied to the hanger lever 38 and thereby to the outer end of the associated member 16, thus augmenting the force applied to the brake shoes 15. The drag of the drum on the brake shoes 13 at this end of the truck has a tendency to move the shoes upwardly but this tendency is overbalanced by the downward force set up by the shoes as they tend to move downwardly along the braking surfaces of the drums under the influence of brake cylinder pressure applied to the lever 30. In other words, the force applied to the outer end of the member 16 through the medium of the hanger lever 38 is the sum of the downwardly directed force produced by the action of the shoes 14 under the influence of the brake cylinder pressure and the force produced by the downward drag of the brake drum on the brake shoes 14, while the force applied to the member 16 through the medium of the hangers 32 is that produced by the action of the shoes 13 under the influence of brake cylinder pressure minus the force due to the upward drag of the brake drum on the shoes 13. From this it will be apparent that the downward pull of the brake shoes 14 at the leading side of the brake drum will exceed the downward pull of the brake shoes at the other side of the drum. At the other or rear end of the truck the downward pull of the brake shoes 13 and 14 on the member 16 is just the reverse of that of the shoes at the front end of the truck since the disposition of the shoes 13 and 14 with respect to the leading and other side of the brake drum is the reverse of that at the front end.

It will here be noted that at the front end of the truck the greater pull of the brake shoes at the leading side of the brake drum is transmitted to the outer end of the member 16 while at the rear end of the truck the corresponding pull of the brake shoes at the leading side is applied to the member 16 intermediate its ends. As a result of this the brake shoes 15 at the front end of the truck will be applied with greater force to the brake drum than will the corresponding brake shoes at the rear end of the truck.

It will be evident that with the brakes applied the members 16 will tend to rotate with the wheels so that the member at the front end of the truck will exert an upward force on its pivot pin 18 and the member at the rear end of the truck will exert downward force on its pivot pin.

In the arrangement shown, the upwardly directed force transmitted to the truck frame through the medium of the member 16 at the front end of the truck slightly exceeds the downwardly directed force transmitted to the truck frame through the medium of the member 16 at the rear end of the truck, but the difference in the magnitude of these forces is so slight as to be negligible. If, however, it should be desired to have each of these forces balance the other, the only change in the present arrangement necessary to insure this result is to connect the inner ends of the member 16 at each side of the truck frame to the frame by a single pin arranged on the transverse center line of the truck, as shown in Fig. 3.

It will be seen that with the brake rigging in application position, the brake shoes 15, besides serving to assist in supporting the member 16 and thereby the brake rigging, also act to resist rotary movement of the drums, thus materially increasing the braking action on a wheel and axle assembly for any given brake applying force applied to the rigging.

When the vehicle is in motion and an application of the brakes is initiated, the momentum of the body of the vehicle has a tendency to tilt the truck forwardly with the result that the adhesion between the rear truck wheels and the track rails will be unintentionally decreased so that these wheels will have a greater tendency to slide on the rails than will the front truck wheels.

With this in mind the brake arrangement disclosed in the drawings has been so designed that the total braking force of the three pairs of brake shoes on the rear wheels of the truck for a given brake cylinder pressure will be less than that of the corresponding brake shoes on the front wheels, thereby lessening the tendency of the rear wheels to slide on the rails.

In practice it has been found that at the front of the truck the pressure applied to the brake shoes 15 is slightly over one-half the total pressure of the associated brake shoes 13 and 14 and that at the rear of the truck the pressure applied to the brake shoe 15 is slightly over one-third of the total pressure of the associated brake shoes 13 and 14. From this it will be seen that the retarding action of the brakes will be considerably less on the rear wheel and axle assembly than on the front wheel and axle assembly and as a result the wheels of the rear wheel and axle assembly will not have as great a tendency to slide on the rails as it would have if the pressure applied to the rear brake shoes 15 were equal to the pressure applied to the front brake shoes 15.

*Release of the brakes*

When it is desired to release the brakes, fluid under pressure is vented from the brake cylinder devices. When this is accomplished the usual release springs, not shown, in the brake cylinder devices cause the brake cylinder pistons and hollow piston rods to move inwardly to their normal release positions. At the same time the force of gravity causes the brake shoes 13 and 14 and the several parts of the brake riggings associated therewith to assume their normal release positions as shown in Figs. 1 to 4, inclusive. It will here be noted that as the brake shoes 13 and 14 move out of contact with the brake drums the springs 22 act to raise the outer end of the member 16, thereby moving the brake shoes 15 out of engagement with the drums, the upward movement of the member being limited by the engagement of the washers 21 with the heads 25 of the bolts and the engagement of the adjusting nuts 26 with the bottom wall of the pocket.

*Slack take-up operation*

Slack in the brake mechanism for each pair of brake drums, due to wear of the brake shoes or any other parts of the mechanism, may be readily taken up by first adjusting the nuts 26 on the bolts 24 and then operating the slack adjusters 42 to vary the effective length of the connectors which operatively connects the levers 30 and 38. It will be noted that when slack is to be taken up, the check nut 27 is slacked back to release the adjusting nut and the adjusting nut is then rotated on the bolt, which bolt is held against rotation by the engagement of the member 16 with the square head of the bolt. As the nut 26 is rotated the bolt 24 and thereby the spring seat 21 are pulled downwardly against the opposing pressure of the spring 22, and as the spring seat is thus being moved, the force of the spring 29 and the force of gravity act to move the outer end of the member 16 with the spring seat. When, due to this movement of the member 16, the brake shoes 15 are lowered to their proper position relative to the brake drums, rotation of the adjusting nut 26 is stopped and the check nut 27 is then turned into locking engagement with the nut.

Following this adjustment of the brake shoes 15, the adjusting nut 45 of the slack adjuster 42 is rotated to cause the adjuster cross head 43 to move forwardly to shorten the effective length of the connector 41 until such time as the brake shoes 13 and 14 are in their proper position with relation to the drums. From this it will be seen that slack in the brake rigging may be readily taken up and that since the slack adjusters and the adjusting nuts for the member 16 are all arranged outboard of the wheels this take-up operation may be easily carried out.

While the invention has been described in detail in connection with a brake drum which is carried by the wheel and axle assembly it will be understood that in cases where sufficient braking can be obtained by the use of three brake shoes, each brake mechanism may be so arranged that the shoes will engage the tread of a wheel of the assembly. In such cases the brake drum will of course be omitted.

Modifications in the structures illustrated and described may be made without departing from the spirit of my invention, and I do not therefore wish to be limited otherwise than by the scope of the appended claims.

Having now described my invention, what I claim as new and desire to secure by Letters Patent, is:

1. The combination with a railway vehicle truck comprising a wheel and axle assembly and a truck frame supported by said assembly, of braking means movable into braking engagement with said assembly, and means movably connected to said truck frame adapted to support said braking means and being movable into braking engagement with said assembly in a zone bisected by a vertical plane through the axis of the wheel and axle assembly under the influence of forces set up by the engagement of said braking means with the assembly.

2. The combination with a railway vehicle truck comprising a wheel and axle assembly and a truck frame supported by said assembly, of braking means movable into braking engagement with said assembly, and a support for said braking means pivotally connected to said truck frame adjacent the transverse center line of the truck for movement by said braking means into braking engagement with said assembly when the braking means is in braking engagement with the assembly.

3. The combination with a railway vehicle truck comprising a wheel and axle assembly and a truck frame supported by said assembly, of braking means comprising clasp arranged brake elements movable into braking engagement with said assembly, and means movably connected to said truck frame at a point located at one side of the vertical center line of said assembly and adapted to support said braking means and being adapted to be moved by said braking means into braking engagement with said assembly when the braking means is in braking engagement with the assembly, and means carried by said truck frame and cooperating with said means for moving the means out of braking engagement with the assembly in releasing the brakes.

4. The combination with a railway vehicle truck comprising a wheel and axle assembly and a truck frame supported by said assembly, of braking means movable into braking engagement with said assembly, said braking means comprising three brake shoes arranged radially about said assembly and movable into and out of braking engagement with the assembly, a system of operatively connected levers and rods for actuating two of said shoes, and means carried by said truck frame for supporting said system of operatively connected rods and levers and operative by said system upon the engagement of said two shoes with said assembly to move the other of said brake shoes into braking engagement with the assembly.

5. The combination with a railway vehicle truck comprising a wheel and axle assembly and a truck frame supported by said assembly, of braking means movable into braking engagement with said assembly, said braking means comprising two brake shoes disposed in clasp arrangement about said wheel and axle assembly and movable into braking engagement with the assembly, mechanism for actuating said brake shoes, another brake shoe movable into braking engagement with the assembly, and means for actuating said other brake shoe, said means being adapted to support said mechanism and being operable by said mechanism to move said other shoe into braking engagement with said assembly.

6. The combination with a railway vehicle truck comprising a wheel and axle assembly and a truck frame supported by said assembly, of braking means comprising clasp arranged brake elements movable into braking engagement with said assembly, and means comprising a third brake element movably connected to said truck frame adapted to support said braking means and being adapted to be moved by said braking means into braking engagement with said assembly when the clasp arranged brake elements are in braking engagement with the assembly, said means and braking means being so arranged and connected together as to provide a greater braking pressure on said means when said assembly is rotating in one direction than when the assembly is rotating in the opposite direction.

7. The combination with a railway vehicle truck comprising a truck frame and a supporting wheel and axle assembly, of a brake drum included in said assembly and located adjacent the outer side of a wheel of the assembly, combined brake and brake supporting means pivotally connected to said truck frame at a point located at one side of the vertical center line of the assembly, and a clasp brake mechanism carried by said means operative into braking engagement with said drum, said clasp brake mechanism being operatively connected to said supporting means at one side of the connection between the supporting means and truck frame, said clasp brake mechanism, when in braking engagement with said drum, being responsive to forces set up by the braking action between the mechanism and the drum to actuate said combined brake and brake supporting means into supporting and braking engagement with said drum.

8. The combination with a railway vehicle truck comprising a truck frame and a supporting wheel and axle assembly, of a brake drum included in said assembly and located adjacent the outer side of a wheel of the assembly, combined brake and brake supporting means carried by said truck frame, and a clasp brake mechanism carried by said means operative into braking engagement with said drum, said clasp brake mechanism, when in braking engagement with said drum, being movable downwardly relative to the drum by forces set up by the frictional braking action between the mechanism and drum for moving said combined brake and brake supporting means into engagement with the drum.

9. The combination with a railway vehicle truck comprising a truck frame and a supporting wheel and axle assembly, of a brake drum included in said assembly, a clasp brake mechanism operative into braking engagement with said drum, said brake mechanism being movable downwardly when in braking engagement with the drum in response to the forces set up due to the braking action between the mechanism and the drum, and a support for said clasp brake mechanism carried by said truck frame and movable downwardly by the brake mechanism relative to the truck frame into engagement with said drum.

10. The combination with a railway vehicle truck comprising a truck frame and a supporting wheel and axle assembly, of a brake drum included in said assembly, a clasp brake mechanism operative into braking engagement with said drum, said brake mechanism being movable downwardly when in braking engagement with the drum in response to the forces set up due to the braking action between the mechanism and the drum, and a support for said clasp brake mechanism carried by said truck frame and movable downwardly by the brake mechanism relative to the truck frame into engagement with said drum, said means, when in engagement with said drum, exerting a retarding force on the drum.

11. The combination with a railway vehicle truck comprising a truck frame and a supporting wheel and axle assembly, of a brake drum included in said assembly, a clasp brake mechanism operative into braking engagement with said drum, said brake mechanism being movable downwardly when in braking engagement with the drum in response to the forces set up due to the braking action between the mechanism and the drum, and a support for said clasp brake mechanism carried by said truck frame and movable downwardly by the brake mechanism relative to the truck frame into engagement with said drum, said means and brake mechanism being so arranged and associated with each other as to exert a higher braking pressure on said drum when the drum is rotating in one direction than when it is rotating in the opposite direction.

12. In a brake rigging for a railway vehicle truck of the type having at least two wheel and axle assemblies and a truck frame which is spring supported from said assemblies, in combination, brake shoes disposed in clasp arrangement about each assembly and movable into frictional braking engagement with the assembly, a mechanism for actuating said shoes, and means carried by said truck frame for supporting said mechanism, said means being responsive to forces set up in said mechanism by the frictional action between said shoes and the assembly to transmit at least the major portion of said forces to said assembly instead of to said truck frame.

13. In a brake rigging for a railway vehicle truck of the type having at least two wheel and axle assemblies and a truck frame which is spring supported from said assemblies, in combination, brake shoes disposed in clasp arrangement about each assembly and movable into frictional braking engagement with the assembly, a mechanism for actuating said shoes, and means carried by said truck frame for supporting said mechanism, said means being responsive to forces set up in said mechanism by the frictional action between said shoes and the assembly to transmit at least the major portion of said forces to said assembly for assisting in braking the assembly and for preventing such forces from acting to move the truck frame downwardly relative to the wheel and axle assemblies.

14. In a railway vehicle truck, the combination with wheel and axle assemblies, of a truck frame spring supported from said assemblies, said truck frame comprising spaced side frames having their ends offset adjacent each wheel and disposed between the wheels of each assembly, a brake drum included in each wheel and axle assembly and located at the outer side of a wheel of the assembly, a brake supporting member pivotally connected at one end to the side frame which is adjacent said drum, and a brake mechanism carried by said supporting member and operative into braking engagement with said drum, said supporting member being movable into supporting engagement with said drum by said brake mechanism when the mechanism is subjected to forces created upon the engagement of said mechanism with the drum.

15. In a railway vehicle truck, the combination with wheel and axle assemblies, of a truck frame spring supported from said assemblies, said truck frame comprising spaced side frames having their ends offset adjacent each wheel and assembly, disposed between the wheels of each assembly, a brake drum included in each wheel and axle assembly and located at the outer side of a wheel of the assembly, a brake supporting member pivotally connected at one end to the side frame which is adjacent said drum, yieldable means interposed between and engaging the other end of said brake supporting member and the truck frame adapted to normally maintain the brake supporting member against downward rocking movement about its pivoted connection with the side frame, and a brake mechanism carried by said brake supporting member and operative into braking engagement with said drum, said supporting member being movable against the opposing pressure of said spring into supporting engagement with said drum by said brake mechanism when the mechanism is subjected to forces created upon the engagement of the mechanism with the drum, said yieldable means being operative when the brake mechanism is moved to brake releasing position to move said member and thereby said brake mechanism upwardly to their normal positions.

16. The combination with a railway vehicle truck comprising a wheel and axle assembly and a truck frame supported by said assembly, of braking means comprising clasp arranged brake elements movable into and out of braking engagement with said assembly, means pivotally connected at one end to said truck frame adapted to support said braking means and being adapted to be moved by said braking means into braking engagement with the assembly when the clasp arranged brake elements are in braking engagement with the assembly, and a spring cooperating with the other end of said means and truck frame for moving the means out of braking engagement with said assembly when the clasp arranged brake elements are moved out of braking engagement with the assembly.

17. The combination with a railway vehicle truck comprising a wheel and axle assembly and a truck frame supported by said assembly, of braking means movable into and out of braking engagement with said assembly, yieldable means mounted on said truck frame, a support for said braking means pivotally connected at one end to said truck frame and resting at its other end on said yieldable means, said support being adapted to be moved against the opposing pressure of said yieldable means by said braking means into braking engagement with the assembly when the braking means is in braking engagement with the assembly, said yieldable means when the braking means is moved out of braking engagement with the assembly being adapted to move said support out of braking engagement with the assembly.

18. The combination with a railway vehicle truck comprising a wheel and axle assembly and a truck frame supported by said assembly, of braking means movable into braking engagement with said assembly, means movably connected to said truck frame adapted to support said braking means and being movable into braking engagement with said assembly under the influence of forces set up by the engagement of said braking means with the assembly, and adjusting means carried by said truck frame operative for adjusting said means relative to said assembly.

19. The combination with a railway vehicle truck comprising a wheel and axle assembly and a truck frame supported by said assembly, of braking means movable into braking engagement with said assembly, means movably connected to said truck frame adapted to support said braking means and being movable into braking engagement with said assembly under the influence of forces set up by the engagement of said braking means with the assembly, and adjusting means interposed between and engaging said truck frame and means and operative to raise or lower said means relative to said assembly.

20. The combination with a railway vehicle truck comprising a wheel and axle assembly and a truck frame supported by said assembly, of braking means movable into braking engagement with said assembly, means movably connected to said truck frame adapted to support said braking means and being movable into braking engagement with said assembly under the influence of forces set up by the engagement of said braking means with the assembly, and means operative to adjust the position of said means relative to said assembly.

21. The combination with a railway vehicle truck comprising a wheel and axle assembly and a truck frame supported by said assembly, of braking means movable into braking engagement with said assembly, means movably connected to said truck frame adapted to support said braking means and being movable into braking engagement with said assembly under the influence of forces set up by the engagement of said braking means with the assembly, means operative to adjust the position of said means relative to said assembly to compensate for wear, and means for adjusting the position of said braking means relative to said assembly to compensate for movement of the braking means due to the adjustment of the brake supporting means and to compensate for wear.

22. The combination with a railway vehicle truck comprising a truck frame and a truck frame supporting wheel and axle assembly, of a brake supporting member pivotally connected to said truck frame and extending into the horizontal plane of a wheel of the assembly, brake shoes disposed in clasp arrangement with respect to said wheel, a vertically disposed lever operable to actuate one of said shoes into braking engagement with said assembly, means for supporting said lever from said member, means for actuating said lever, a dead lever supported from said member and operable by said brake cylinder lever to actuate the other of said shoes into braking engagement with said assembly, and a brake shoe carried by said member adapted to be actuated by said member into braking engagement with the assembly, said member being operable to effect the engagement of the last mentioned brake shoe with the assembly through the medium of the connections from the clasp arranged shoes to the member when the clasp arranged shoes are in braking engagement with the assembly.

23. The combination with a railway vehicle truck comprising a truck frame and a truck frame supporting wheel and axle assembly, of a brake supporting member pivotally connected to said truck frame and extending into the horizontal plane of a wheel of the assembly, brake shoes displayed in clasp arrangement with respect to said wheel, a vertically disposed lever operable to actuate one of said shoes into braking engagement with said assembly, means for supporting said lever from said member, means for actuating said lever, a dead lever supported from said member and operable by said brake cylinder lever to actuate the other of said shoes into braking engagement with said assembly, and a brake shoe carried by said member adapted to be actuated by said member into braking engagement with the assembly, said member being operable to effect the engagement of the last mentioned brake shoe with the assembly through the medium of the connections from the clasp arranged shoes to the member when the clasp arranged shoes are in braking engagement with the assembly, and with a pressure proportional to the force transmitted from the clasp arranged shoes to the member.

24. The combination with a railway vehicle truck comprising a truck frame and a truck frame supporting wheel and axle assembly of a brake supporting member pivotally connected to said truck frame and extending into the horizontal plane of a wheel of the assembly, brake shoes disposed in clasp arrangement with respect to said wheel, a vertically disposed lever operable to actuate one of said shoes into braking engagement with said assembly, means for supporting said lever from said member, means for actuating said lever, a dead lever supported from said member and operable by said brake cylinder lever to actuate the other of said shoes into braking engagement with said assembly, and a brake shoe located between said brake cylinder and hanger levers and carried by said member, said member being actuable by said hanger lever and hanger under the influence of the action of the clasp arranged brake shoes when in braking engagement with the assembly.

25. The combination with a railway vehicle truck comprising a truck frame and a supporting wheel and axle assembly, of spaced brake drums included in said assembly, two pairs of laterally spaced brake shoes disposed in clasp arrangement about said drums, a brake lever for actuating one of said pairs of shoes into braking engagement with said drums, a lever operable by the first mentioned lever for actuating the other of said pairs of shoes into braking engagement with said drums, and a member extending through the space between said drums and operatively connecting said levers.

26. In a railway vehicle truck comprising a wheel and axle assembly, a side member offset inwardly from an adjacent wheel of the wheel and axle assembly to accommodate the wheel, said side member having a laterally extending supporting bracket which terminates beyond the outer side of said wheel, a brake drum included in said wheel and axle assembly and located at the outer side of said wheel, a brake mechanism operable into and out of braking engagement with said drum, and a carrier for said brake mechanism extending longitudinally of the truck and bridging the offset portion of said side member, said carrier being supported at one end of the side member and at the other end by said bracket.

27. In a railway vehicle truck comprising a wheel and axle assembly, a side member offset inwardly from an adjacent wheel of the wheel and axle assembly to accommodate the wheel, said side member having a laterally extending supporting bracket which terminates beyond the outer side of said wheel, a spring supported on the outer end of said bracket, a brake drum included in said wheel and axle assembly and located at the outer side of said wheel, a brake mechanism operable into and out of braking engagement with said drum, and a carrier for said brake mechanism extending longitudinally of the truck and bridging the offset portion of said side member, said carrier being pivotally supported at one end to said side frame and its other end being yieldably supported by said spring, said carrier being operable in effecting an application of the brakes into supporting engagement with said drum for transmitting forces set up in the brake mechanism due to the brake action to said drum and thereby to said wheel and axle assembly.

28. In a brake mechanism for a railway vehicle truck, in combination, a braking surface carried by and rotatable with a wheel and axle assembly of the truck, clasp arranged brake elements movable into braking engagement with said surface, operatively connected dead and live levers for actuating said elements, another brake element movable into braking engagement with said surface and operatively connected to said dead lever, and means operatively connecting said live lever to said other element, said dead lever and means being operative by the clasp arranged brake elements for actuating said other brake element.

29. In a brake mechanism for a railway vehicle truck, in combination, a braking surface carried by and rotatable with a wheel and axle assembly of the truck, clasp arranged brake elements movable into braking engagement with said surface, a dead lever for actuating one of said elements, a live lever for actuating the other of said elements, means operatively connecting said levers, another brake element movable into braking engagement with said surface, means operatively connecting said other brake element and dead lever and means operatively connecting said brake element and live lever, both of said means being operable by said clasp arranged brake elements for actuating said other brake element.

30. The combination with a railway vehicle truck comprising a truck frame and a supporting wheel and axle assembly having an annular braking surface, of a brake mechanism for said assembly arranged to frictionally engage at least three portions of said surface which portions are spaced and included in an arc of said surface which exceeds 180° of said surface, means normally supporting said mechanism from said truck frame and having a loose connection with said frame providing for vertical movement of said mechanism relative to said frame into braking engagement with said surface and operative to hold said mechanism against rotation with said surface, and means for actuating said mechanism into braking engagement with said surface.

31. The combination with a railway vehicle truck comprising a truck frame and a supporting wheel and axle assembly having an annular braking surface, of a brake mechanism for said assembly arranged to frictionally engage at least three portions of said surface which portions are spaced and included in an arc of said surface which exceeds 180° of said surface, said mechanism having a single pivotal connection with said frame to prevent rotation thereof with said assembly and providing for movement thereof relative to said frame from a normal release position into braking engagement with said surface, and means for actuating said mechanism into braking engagement with said surface.

32. The combination with a railway vehicle truck comprising a truck frame and a supporting wheel and axle assembly having an annular braking surface, of a brake mechanism for said assembly comprising three operatively connected brake elements two of which are arranged at opposite sides of said surface in clasp relation while the third is disposed above said surface on the vertical center line thereof, means for applying force to said two elements in such a direction as to urge said two elements into braking engagement with said surface and away from said third element for thereby effecting movement of said third element into braking engagement with said surface, and means connecting said third element to said frame for securing said brake mechanism against rotation with said assembly.

33. The combination with a railway vehicle truck comprising a truck frame and a supporting wheel and axle assembly having an annular braking surface, of a brake mechanism for said assembly comprising three operatively connected brake elements two of which are arranged at opposite sides of said surface in clasp relation while the third is disposed above said surface on the vertical center line thereof, means for applying force to said two elements in such a direction as to urge said two elements into braking engagement with said surface and away from said third element for thereby effecting movement of said third element into braking engagement with said surface, and means connecting said third element to said frame for securing said brake mechanism against rotation with said assembly and for supporting said brake mechanism from said frame.

34. The combination with a railway vehicle truck comprising a wheel and axle assembly and a truck frame supported by said assembly, a pair of clasp arranged brake elements and a third brake element movable into braking engagement with the assembly, a structure supporting all of the elements at points spaced along its length, the point of support for the third brake element being located intermediate the point of connection for the clasp arranged brake elements, and means providing a pivotal connection between the structure and truck frame at a point located at one side of the pivotal connection between the third brake element and structure.

35. The combination with a railway vehicle truck comprising a wheel and axle assembly and a truck frame supported by said assembly, a pair of clasp arranged brake elements and a third brake element movable into braking engagement with the assembly, a structure supporting all of the elements at points spaced along its length, the point of support for the third brake element being located intermediate the points of connection for the clasp arranged brake elements, and means providing a pivotal connection between the structure and truck frame at a point located at one side of the pivotal connection between the third brake element and structure and beyond the pivotal connection between one of said clasp arranged brake elements and the structure.

36. In a brake mechanism for a railway vehicle truck, in combination, a braking surface carried by and rotatable with a wheel and axle assembly of the truck, clasp arranged brake elements movable into braking engagement with said surface, operatively connected dead and live levers for actuating said elements, braking means also movable into braking engagement with said surface, one end of said dead lever being fulcrumed on said braking means, and means operatively connecting said live lever, braking means and dead lever, said dead lever and means cooperating to actuate said braking means.

37. In a brake mechanism for a railway vehicle truck, in combination, a braking surface carried by and rotatable with a wheel and axle assembly of the truck, clasp arranged brake elements movable into braking engagement with said surface, operatively connected dead and live levers for actuating said elements, a movable braking member for also effecting braking of said surface, one end of said dead lever being fulcrumed on said member, and means operatively connecting said live lever, member and dead lever, said dead lever and means cooperating to actuate said member.

38. In a brake mechanism, the combination with a rotating member having an annular braking surface, of friction braking means operatively mounted for engagement with a portion of said surface along one side thereon, a pair of pivotally mounted levers operatively connected to said braking means, a rigid tie rod connecting the ends of said levers, a pair of movable spaced elements operatively connected to said levers and movably mounted opposite said braking means for engagement with said braking surface at points equally spaced more than 90° from the median point of engagement therewith by said braking means, and power means operable through the medium of said levers to constrict said spaced elements toward each other and slidably against said braking surface for thereby drawing the braking means into engagement with said surface.

CARLTON D. STEWART.